United States Patent [19]

Ikari et al.

[11] Patent Number: 4,618,234
[45] Date of Patent: Oct. 21, 1986

[54] FINDER OPTICAL SYSTEM FOR CAMERAS

[75] Inventors: Kazuo Ikari, Hachiouji; Toru Fujii, Hino, both of Japan

[73] Assignee: Olympus Optical Co., Ltd., Tokyo, Japan

[21] Appl. No.: 717,092

[22] Filed: Mar. 28, 1985

[30] Foreign Application Priority Data

Mar. 29, 1984 [JP]  Japan .................................. 59-61766

[51] Int. Cl.$^4$ ............................................. G03B 13/08
[52] U.S. Cl. .................................... 354/225; 358/224; 350/463; 350/572
[58] Field of Search ...................... 354/219, 224, 225; 352/171, 244; 358/224; 350/169, 171, 173, 538, 572, 576, 463

[56] References Cited

U.S. PATENT DOCUMENTS 4,387,967  6/1983  Yamazaki et al. ............... 354/224 X
4,544,250  10/1985  Tanaka et al. .................... 354/224 X

FOREIGN PATENT DOCUMENTS 58-86612  6/1983  Japan .

*Primary Examiner*—William B. Perkey
*Attorney, Agent, or Firm*—Cushman, Darby & Cushman

[57] ABSTRACT

A finder optical system for single-lens reflex cameras comprising a screen on which an image by a photographing lens is to be formed through a half-mirror and a relay lens for forming the image formed on the screen in a focal position in front of a magnifying lens so that, when the focal distance of the magnifying lens is represented by $f_{oc}$ and the distance from the screen to the front principal point position of the magnifying lens is represented by L, the relation of $0.2 \leq f_{oc}/L \leq 0.8$ will satisfied, in order to make it easy to replace the photographing lens and to make the magnification high while keeping the eye point in a position sufficiently separated from the screen.

4 Claims, 5 Drawing Figures

FINDER OPTICAL SYSTEM FOR CAMERAS

BACKGROUND OF THE INVENTION

1. Field of the Invention

This invention relates to a finder optical system for such cameras as videocameras and cinecameras.

2. Description of the Prior Art

In the formation of the conventional finder optical system of this kind, for example, as shown in FIG. 1, a light path is divided by a half-mirror 3 arranged between a photographing lens 1 and photographing relay lens 2 so that an image may be once formed of a part of the light from an object to be photographed on a screen 7 through a relay lens 4, mirror 5 and relay lens 6 and may be magnified by a magnifying lens 8 to be observed. However, there has been a problem that, in such formation, as the half-mirror 3 and relay lens 2 enter the camera body, it is difficult to interchange the lenses. There has been also a problem that, even if only the lens part in front of the half-mirror 3 is to be interchanged, the freedom in the optical design will reduce. Further, in such formation, if the finder magnification is to be raised, the visual angle of the relay lens 4 will become so large as to require a lens as large as the photographing relay lens, resulting in a high cost. Therefore, naturally, there has been a problem that the focal length of the relay lens 4 can not help being made longer and the visual field can not help being made smaller, that is to say, the magnification of the finder system can not help reducing. This problem is also caused by the fact that, as this kind of camera requires a comparatively long space on the photographing device part side, the position of the finder eye point 9 is required to be far from the half-mirror 3.

SUMMARY OF THE INVENTION

A primary object of the present invention is to provide a finder optical system wherein it is easy to interchange lenses and the magnification can be set to be high while keeping the eye point position long enough from the screen so that a composition easier to see may be determined and in focusing high in the precision may be made.

According to the present invention, this object is attained by a formation wherein an image by a photographing lens is once formed on a screen through a half-mirror and is formed in the front side principal point position of a magnifying lens by a relay lens so that, when the focal length of the magnifying lens is represented by $f_{oc}$ and the distance from the screen to the front principal point position of magnifying lens is represented by L, the relation of $0.2 \leq f_{oc}/L \leq 0.8$ may be satisfied.

According to a preferred formation of the present invention, the principal ray passing through an eyepoint located at the rear principal point position of the magnifying lens is substantially parallel with the optical axis in the position conjugate with a screen with respect to a relay lens.

According to another preferred formation of the present invention, in order to indicate photographing informations within the finder, an indicating optical system comprising at least one lens and at least two mirrors is arranged in the position conjugate with a screen with respect to a relay lens.

This and other objects of the present invention will become more apparent during the course of the following detailed description and appended claims,

DESCRIPTION OF THE PREFERRED EMBODIMENTS

Figure 1:
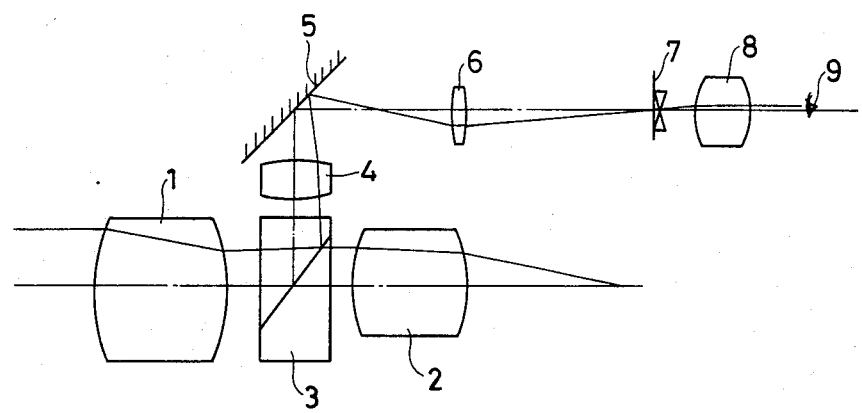
FIG. 1 is a view showing a conventional finder optical system.
Figure 2:
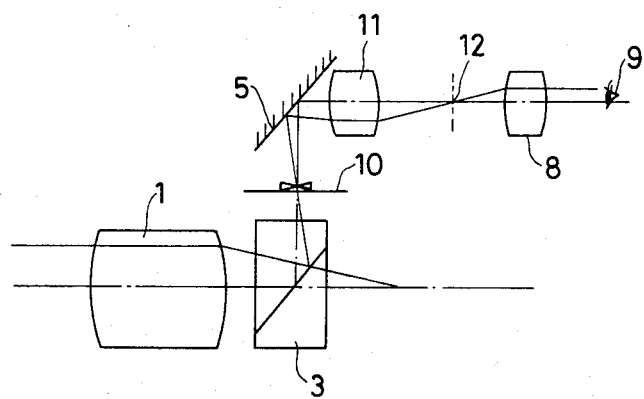
FIG. 2 is view showing an embodiment of the finder optical system according to the present invention.

The present invention shall be explained in detail in the following on the basis of the embodiment shown in FIG. 2 by attaching the same reference numerals to the same respective members as in the above mentioned conventional example. The image by the photographing lens 1 is to be once formed on the screen 10 and the image on the screen 10 is to be formed on the front side focal surface 12 of the magnifying lens 8. Therefore, according to this formation, the photographing relay lens in the conventional example is not required, therefore a part of the photographing system does not enter the camera body and it is easy to interchange the lens. Also, by meeting the below mentioned conditions, the magnification of the finder system can be raised while keeping the distance from the screen 10 to the eye point 9 comparatively long. That is to say, if the focal length of the magnifying lens 8 is represented by $f_{oc}$, the focal length of the relay lens 11 is represented by $f_R$ and the magnification of the relay lens 11 is represented by $\beta(<0)$, the distance L from the screen 10 to the front side principal point position of the magnifying lens 8 will be represented as followings:

$$L = f_R\left(2 - \beta - \frac{1}{\beta}\right) + f_{oc} \tag{1}$$

Here, if the focal length of the entire finder system is represent by $f_{all}$, $$f_{all} = f_{oc}/\beta \tag{2}$$

Therefore, the smaller the absolute values of the focal length $f_{all}$, the larger the focal length. Therefore, from the formula (2), the the larger the absolute value of $\beta$, the better. According to the formula (1), $f_R$ will have a maximum value when $\beta$ is $-1$ and will become smaller even when $\beta$ is larger or smaller than it. However, if $|\beta|$ is larger than 1, the second image forming surface will become larger and the optical system will become so larger as to be undesirable. Therefore, for making the system smaller, $|\beta|$ is less than 1 and the smaller $|\beta|$, the better but the focal length $f_R$ of the relay lens 11 will become so small that the performance as of the finder system will progressively deteriorate due to the aberration accurred by the relay lens 11. Therefore, in the present invention, there is found a condition whereby a distance L long enough can be secured without the deterioration of the performance of the finder system. It is, $$0.2 \leq f_{oc}/L \leq 0.8$$

If $f_{oc}/L$ is smaller than 0.2, the occurrence of the curvature aberration by the magnifying lens 8 will become so large that the performance of the relay lens 11 will not be able to be kept by the magnifying lens 8. On the contrary, if $f_{oc}/L$ becomes larger than 0.8, the power of the relay lens 11 will become so strong that the occurrence of various aberrations will be unavoidable.

By the way, at this time, the magnification of the relay lens 11 will be preferably $-1 \leq \beta \leq -0.2$. That is to say, if the absolute value of $\beta$ becomes smaller than 0.2, the image will be magnified by the magnifying lens 8 and therefore the aberration will deteriorate. On the contrary, if the absolute value of $\beta$ becomes larger than 1, the finder optical system will become larger.

Figure 3:
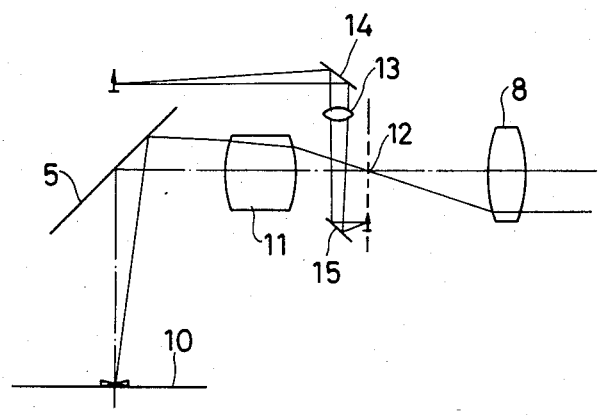
FIG. 3 is a view showing the case that an indicating system is incorporated in the above mentioned embodiment.

Further, in such finder optical system, an image position (focal surface 12) conjugate with the screen 10 with respect to the relay lens 11 will be produced. Therefore, not only the images by the intrinsic photographing lens 1 but also such finder informations as exposure informations can be indicated in this image position through a mirror, In this case, it is generally preferable that, under the above mentioned magnification conditions, $|\beta|$ is smaller than 1 and therefore it is necessary to photograph also the image used in the indication at a small image forming magnification. Therefore, as shown in FIG. 3, a proper indication can be made within the finder by using at least one relay lens 13 and at least two mirrors 14 and 15.

Figure 4:
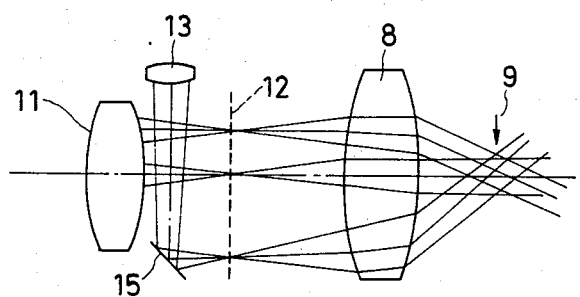
FIG. 4 is a view showing the case that the principal ray at the image forming point by the relay lens in FIG. 3 is made parallel with the optical axis of the principal ray.

Also, in the case of thus putting the indicating system into the finder optical system, for example, in the case of an indication by using a transparent type liquid crystal, it is desirable that, as shown in FIG. 4, the principal ray at the image forming point (focal surface 12) by the relay lens 11 is parallel with the optical axis. This can roughen the precision of the angle of inclination of the mirror 15 used in the indication to the optical axis and can make it easy to separate the light path made intrinsically by the photographing lens 1 and the indicating system light path from each other with the mirror. Therefore, the principal ray passing through the eye point 9 located at the rear side principal point position of the magnifying lens 8 may be substantially parallel with the optical axis in the position conjugate with the screen 10 with respect to the relay lens 11.

Figure 5:
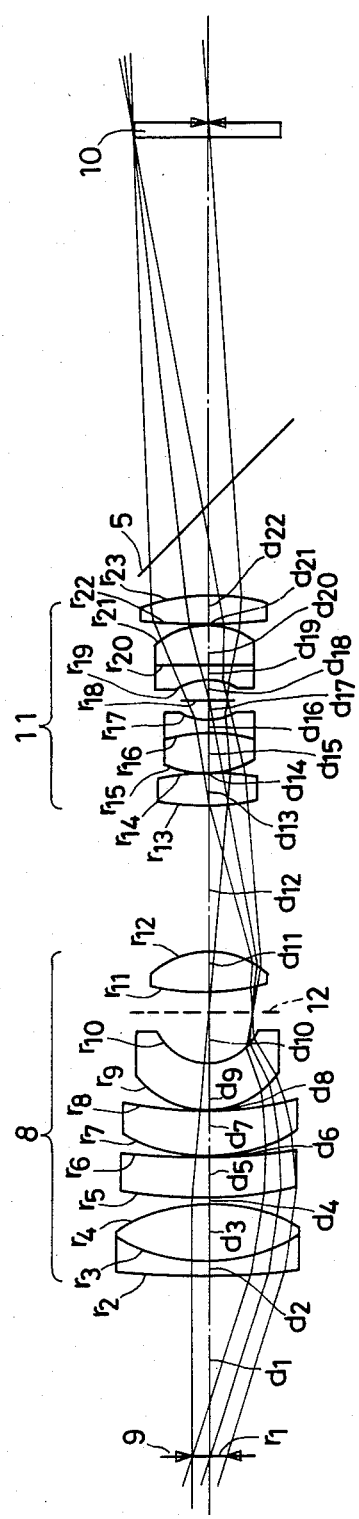
FIG. 5 is a view showing a concrete arrangement of the above mentioned embodiment.

FIG. 5 shows a concrete arrangement example of the above mentioned embodiment. The numberical values are shown in the following:

| | | | |
|---|---|---|---|
| $r_1 = \infty$ (eye point) | | | |
| | $d_1 = 12.0000$ | | |
| $r_2 = 50.756$ | | | |
| | $d_2 = 1.0000$ | $n_1 = 1.78472$ | $\nu_1 = 25.71$ |
| $r_3 = 11.9536$ | | | |
| | $d_3 = 3.7930$ | $n_2 = 1.61800$ | $\nu_2 = 63.38$ |
| $r_4 = -11.8012$ | | | |
| | $d_4 = 0.4546$ | | |
| $r_5 = 26.8323$ | | | |
| | $d_5 = 2.8061$ | $n_3 = 1.77250$ | $\nu_3 = 49.66$ |
| $r_6 = 52.7632$ | | | |
| | $d_6 = 0.1000$ | | |
| $r_7 = 13.2634$ | | | |
| | $d_7 = 3.0523$ | $n_4 = 1.77250$ | $\nu_4 = 49.66$ |
| $r_8 = 34.9044$ | | | |
| | $d_8 = 0.1000$ | | |

-continued

| | | | |
|---|---|---|---|
| $r_9 = 6.1361$ | | | |
| | $d_9 = 3.0000$ | $n_5 = 1.77250$ | $\nu_5 = 49.66$ |
| $r_{10} = 3.6496$ | | | |
| | $d_{10} = 5.6310$ | | |
| $r_{11} = 65.4373$ | | | |
| | $d_{11} = 2.0000$ | $n_6 = 1.49109$ | $\nu_6 = 57.00$ |
| $r_{12} = -9.8137$ | | | |
| | $d_{12} = 10.0000$ | | |
| $r_{13} = 111.0992$ | | | |
| | $d_{13} = 2.0500$ | $n_7 = 1.77250$ | $\nu_7 = 49.66$ |
| $r_{14} = -22.1002$ | | | |
| | $d_{14} = 0.1000$ | | |
| $r_{15} = 7.5614$ | | | |
| | $d_{15} = 2.8000$ | $n_8 = 1.72916$ | $\nu_8 = 54.68$ |
| $r_{16} = -14.2693$ | | | |
| | $d_{16} = 0.7486$ | $n_9 = 1.72825$ | $\nu_9 = 28.46$ |
| $r_{17} = 5.4086$ | | | |
| | $d_{17} = 1.3691$ | | |
| $r_{18} = \infty$ (flare stop) | | | |
| | $d_{18} = 1.5962$ | | |
| $r_{19} = -4.6293$ | | | |
| | $d_{19} = 0.7732$ | $n_{10} = 1.80440$ | $\nu_{10} = 39.58$ |
| $r_{20} = 54.5226$ | | | |
| | $d_{20} = 2.7915$ | $n_{11} = 1.62280$ | $\nu_{11} = 57.06$ |
| $r_{21} = -6.1433$ | | | |
| | $d_{21} = 0.1000$ | | |
| $r_{22} = 37.3078$ | | | |
| | $d_{22} = 1.9866$ | $n_{12} = 1.74320$ | $\nu_{12} = 49.31$ |
| $r_{23} = -12.6994$ | | | | where $r_1, r_2, \ldots$ represent radii of curvature of the respective surfaces of the lenses of the finder optical system, $d_1, d_2, \ldots$ represent thicknesses and air spaces of the respective lenses of the finder optical system, $n_1, n_2, \ldots$ represent refractive indices of the respective lenses of the finder optical system and $\nu_1, \nu_2, \ldots$ represent Abbe's numbers of the respective lenses of the finder optical system.

As described above, the finder optical system for single-lens reflex cameras according to the present invention has practically important advantages that the lenses can be easily interchanged and that the magnification can be set to be high while keeping the eye point position long enough from the screen.

What is claimed is:

1. A finder optical system for cameras comprising a photographing lens, a half-mirror for dividing light having passed through said photographing lens into two, a screen on which an image of an object to be photographed is to be formed by light having passed through said photographing lens and reflected by said half-mirror and a relay lens for forming said image in a front side focal position of a magnifying lens, a relation of $0.2 \leq f_{oc}/L \leq 0.8$ being satisfied, where a focal length of the magnifying lens is represented by $f_{oc}$ and distance from the screen to a front side principal point position of the magnifying lens is represented by L.

2. A finder optical system according to claim 1, wherein a principal ray passing through an eye point located at a rear side principal point position of said magnifying lens is substantially parallel with an optical axis in a position conjugate with said screen with respect to said relay lens.

3. A finder optical system according to claim 1 further comprising an indicating optical system comprising at least one lens and at least two mirrors to form an image for indicating finder informations in the position conjugate with said screen with respect to said relay lens.

4. A finder optical system according to claim 1, wherein said magnifying lens comprises a first lens component being a cemented biconvex lens, a second lens component being a positive meniscus lens convex toward said first lens component, a third lens component being a positive miniscus lens convex toward said second lens component, a fourth lens component being a positive meniscus lens convex toward said third lens component and a fifth lens component being a biconvex lens, said relay lens comprises a sixth lens component being a biconvex lens, a seventh lens component being a cemented negative lens convex toward said sixth lens component, a eighth lens component being a cemented negative lens concave toward said seventh lens component and a ninth lens component being a biconvex lens, and said finder optical system has the following numerical data:

| | | | |
|---|---|---|---|
| $r_1 = \infty$ (eye point) | | | |
| | $d_1 = 12.0000$ | | |
| $r_2 = 50.756$ | | | |
| | $d_2 = 1.0000$ | $n_1 = 1.78472$ | $\nu_1 = 25.71$ |
| $r_3 = 11.9536$ | | | |
| | $d_3 = 3.7930$ | $n_2 = 1.61800$ | $\nu_2 = 63.38$ |
| $r_4 = -11.8012$ | | | |
| | $d_4 = 0.4546$ | | |
| $r_5 = 26.8323$ | | | |
| | $d_5 = 2.8061$ | $n_3 = 1.77250$ | $\nu_3 = 49.66$ |
| $r_6 = 52.7632$ | | | |
| | $d_6 = 0.1000$ | | |
| $r_7 = 13.2634$ | | | |
| | $d_7 = 3.0523$ | $n_4 = 1.77250$ | $\nu_4 = 49.66$ |
| $r_8 = 34.9044$ | | | |
| | $d_8 = 0.1000$ | | |
| $r_9 = 6.1361$ | | | |
| | $d_9 = 3.0000$ | $n_5 = 1.77250$ | $\nu_5 = 49.66$ |
| $r_{10} = 3.6496$ | | | |
| $r_{11} = 65.4373$ | | | |
| | $d_{10} = 5.6310$ | | |
| | $d_{11} = 2.0000$ | $n_6 = 1.49109$ | $\nu_6 = 57.00$ |
| $r_{12} = -9.8137$ | | | |
| | $d_{12} = 10.0000$ | | |
| $r_{13} = 111.0992$ | | | |
| | $d_{13} = 2.0500$ | $n_7 = 1.77250$ | $\nu_7 = 49.66$ |
| $r_{14} = -22.1002$ | | | |
| | $d_{14} = 0.1000$ | | |
| $r_{15} = 7.5614$ | | | |
| | $d_{15} = 2.8000$ | $n_8 = 1.72916$ | $\nu_8 = 54.68$ |
| $r_{16} = -14.2693$ | | | |
| | $d_{16} = 0.7486$ | $n_9 = 1.72825$ | $\nu_9 = 28.46$ |
| $r_{17} = 5.4086$ | | | |
| | $d_{17} = 1.3691$ | | |
| $r_{18} = \infty$ (flare stop) | | | |
| | $d_{18} = 1.5962$ | | |
| $r_{19} = -4.6293$ | | | |
| | $d_{19} = 0.7732$ | $n_{10} = 1.80440$ | $\nu_{10} = 39.58$ |
| $r_{20} = 54.5226$ | | | |
| | $d_{20} = 2.7915$ | $n_{11} = 1.62280$ | $\nu_{11} = 57.06$ |
| $r_{21} = -6.1433$ | | | |
| | $d_{21} = 0.1000$ | | |
| $r_{22} = 37.3078$ | | | |
| | $d_{22} = 1.9866$ | $n_{12} = 1.74320$ | $\nu_{12} = 49.31$ |
| $r_{23} = -12.6994$ | | | | wherein reference symbols $r_1$ through $r_{23}$ respectively represent redii of carvature of respective surface of respective lenses, reference symbols $d_1$ through $d_{22}$ respectively represent thickness of respective lens and airspaces between respective lenses, reference symbols $n_1$ through $n_{12}$ respectively represent refractive indices of respective lenses, and reference symbols $\nu_1$ through $\nu_{12}$ respectively represent Abbe numbers of respective lenses.

* * * * *